United States Patent Office 3,074,918
Patented Jan. 22, 1963

3,074,918
POLYMERIZATION OF CYCLIC OLEFINS
Herbert Sousa Eleuterio, Wilmington, Del., assignor to E. I. du Pont de Nemours and Company, Wilmington, Del., a corporation of Delaware
No Drawing. Filed June 20, 1957, Ser. No. 667,018
17 Claims. (Cl. 260—93.1)

The present invention relates to the polymerization of cyclic olefins and to novel polymeric products obtained therefrom.

It was heretofore known that metal oxides selected from group VI–B of the periodic table of elements when supported on inert carriers on activation by treatment with a reducing gas would give rise to active catalysts capable of polymerizing ethylene to high molecular weight solid polymers. The activity of these catalysts is further increased by the addition of a promoter in the form of a metal hydride selected from groups I to III of the periodic table of elements. The preparation of these catalysts is illustrated in U.S. Patents 2,691,647, 2,726,231, 2,728,758, 2,731,452 and 2,731,453, among others.

The activity of these catalysts has heretofore been believed to be limited to the polymerization of terminally unsaturated gaseous monomers such as ethylene and propylene.

In accordance with the present invention it was discovered that supported group VI–B metal oxide catalysts, preferably activated by treatment with a reducing gas, when reacted with a group I to III metal hydride will polymerize cyclic olefins to high molecular weight polymers. It was furthermore discovered that the polymerization of the cyclic olefins does not proceed, as would be expected through the opening of the double bond, but through the breaking of the ring. Consequently, the polymerization of monocyclic olefins such as cyclopentene gives rise to linear polymers, the polymerization of bicyclic olefins gives rise to polymers containing recurring single ring structures and in general polycyclic olefins gives rise to polymers containing recurring units in which the unit has one ring structure less than the original monomer.

The olefins employed in the present invention are cyclic olefins having at least one unsubstituted ring double bond and not more than one double bond in each ring. Thus representative examples of monocyclic, bicyclic and tricyclic olefins employed in the present invention are cyclopentene, cyclohexene, cyclobutene, cyclooctene, bicyclo-(2,2,1)-heptene-2, substituted bicyclo-(2,2,1)-heptene-2, bicyclopentadiene, substituted bicyclopentadienes, 1,2-dihydrobicyclopentadiene, etc.

The catalyst employed in the present invention and its preparation have been illustrated in the prior art. The group VI–B metal oxides employed in the present invention comprise the metal oxides of chromium, molybdenum, tungsten and uranium. These metals are listed in group VI–B of the periodic table of elements as illustrated in "The Handbook of Chemistry and Physics," Chemical Rubber Publishing Company, 37th edition, page 392. The preferred metal oxide is molybdenum oxide. The carriers employed to support the catalyst are difficultly reducible metal oxides such as titania, zirconia and alumina. The ratio of the group VI–B metal oxide to the support may be varied from 1:20 to 1:1, but is preferably in the range of 1:10. Although the treatment of the supported metal oxide, when employed in combination with a metal hydride, with a reducing gas is not absolutely essential, it is generally preferred to treat the supported catalyst with hydrogen at a temperature of 350° C. to 850° C. The treatment may be carried out at atmospheric pressure, at elevated hydrogen pressures or at partial pressures of hydrogen.

The reactive catalyst is formed by treating the supported metal oxide with a metal hydride wherein the metal is selected from groups I, II and III of the periodic table of elements in the presence of an inert, liquid hydrocarbon solvent in which the metal hydride is either dissolved or dispersed. The metal hydrides employed are the hydrides of alkali metals, alkaline earth metals and boron and aluminum. This treatment may be carried out over a wide range of temperatures from room temperature to 300° C. The treatment may further be carried out prior to polymerization or in the presence of the monomer to be polymerized at polymerization conditions. The quantity of the metal hydride added to the supported group VI–B metal oxide may be greatly varied from about 0.01 to 1 parts of metal hydride per part of the solid catalyst. The catalysts can be employed in various forms and sizes, e.g., powders, granules or shaped pellets.

The polymerization of the cyclic olefins according to the present invention is preferably carried out in the presence of a hydrocarbon solvent, liquid at polymerization conditions. The polymerization may also be carried out in bulk where the monomer is liquid at polymerization conditions. It is, however, generally preferred to employ sufficient solvent to maintain the polymer formed in solution since such conditions greatly facilitate the separation of catalyst from polymer. The polymerization temperature can be varied from room temperature to 250° C. and above. The polymerization pressure is not critical. Generally, the monomers employed in the present invention are liquids and are polymerized under autogenous pressure. However, it is quite feasible to carry out the process of the present invention at elevated pressures up to 200 atmospheres, and above, if such can be obtained with the liquid monomers employed. The quantity of the catalyst may vary depending on such process conditions as temperature and physical form of the catalyst. In general, the catalyst is employed in quantities varying from 0.01 to 10% of the monomer.

The present invention is further illustrated by the following examples:

*Example 1*

A sample of 7.5% molybdena on gamma-alumina (commercially available from the Oronite Co.) was heated in a stream of hydrogen at atmospheric pressure for 16 hours at 480° C. Into a 250 ml. flask was charged under an atmosphere of nitrogen 100 ml. of benzene having therein dispersed 6 g. of the hydrogen treated molybdena on alumina. To the dispersion was added under agitation 1.5 g. of lithium aluminum hydride and 50 ml. of bicyclo-(2,2,1)-heptene-2. The reaction mixture was allowed to stand for a period of 12 hours at room temperature. The resulting polymer catalyst mixture was filtered, and the polymer was extracted by refluxing with xylene and precipitated with methanol. A solid polymeric material weighing 2 g. was obtained. The polymer was molded into a film and subjected to infrared analysis and X-ray analysis. The polymer was found to be amorphous in structure and was found to contain trans-unsaturation and a considerable amount of cis-unsaturation. The polymer was dissolved in carbon tetrachloride and ozonized. A solid acid was obtained. The p-bromophenacyl derivative of the acid was found to have a melting point at 166–168° C. A mixed melting point determination with an authentic sample of di-p-bromophenacyl ester of cis-1,3-cyclopentane dicarboxylic acid showed no depression. An infrared scan of the ester prepared from the acid obtained from ozonization of the polymer was found to be identical to the infrared scan of the di-p- bromophenacyl ester of cis-1,3-cyclopentane dicarboxylic acid. The polymer thus corresponds to the structural formula:

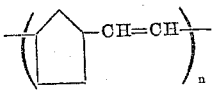

Example II

Into a 330 ml. stainless steel autoclave was charged under nitrogen 6 g. of hydrogen treated moylbdena on alumina (prepared as described in Example I) dispersed in 100 ml. of benzene, 1.5 g. of lithium aluminum hydride and 50 g. of bicyclo-(2,2,1)-heptene-2. The reactor was heated to 100° C. and agitated at that temperature under autogenous pressure for a period of 4 hours. The resulting polymer solution was filtered to remove the catalyst and the polymer was precipitated by the addition of methanol. The dried washed solid polymer weighed 2 g. The polymer could be molded into tough rubbery films. The infrared scan of the films was similar to the one obtained from the polymer prepared in Example I.

Example III

Into a reaction flask was charged under nitrogen 5 g. of hydrogen reduced chromia on gamma-alumina (commercially available) which had been reduced by the treatment described in Example I. To the reaction mixture was added under mild agitation 1 g. of lithium aluminum hydride and 50 g. of bicyclo-(2,2,1)-heptene-2. The reaction mixture was allowed to stand overnight. The catalyst-polymer mixture was extracted with boiling benzene. A solid polymer of bicyclo-(2,2,1)-heptene-2 weighing 1.0 g. was obtained.

Example IV

Into a 330 cc. stainless steel autoclave was charged under nitrogen 8 g. of hydrogen reduced molybdena on alumina (prepared according to the procedure in Example I) dispersed in 50 ml. of benzene, 1.5 g. of lithium aluminum hydride and 50 ml. of cyclopentene. The reaction mixture was heated to 100° C. and agitated at autogenous pressure for a period of 6 hours. The resulting reaction mixture was filtered to remove the catalyst and then treated with methanol to precipitate the polymer. On filtering, washing and drying, 2 g. of a solid polymer was obtained. The polymer could be molded into rubbery films at elevated pressure and temperatures. An infrared scan of the molded film showed trans- and considerable cis-unsaturation. X-ray analysis showed the polymer to be amorphous. On orientation, however, the polymer developed crystallinity. The identity period of the polymer was calculated to be 11.8 A. The following polymer structure was found to be consistent with infrared and X-ray analysis:

$$\text{+CH}_2\text{—CH}_2\text{—CH}_2\text{—CH=CH+}_n$$

Example V

Into a 330 ml. stainless steel autoclave was charged under nitrogen 8 g. of hydrogen reduced molybdena on alumina (prepared according to procedure in Example I) in 50 ml. of benzene, 1.5 g. of lithium aluminum hydride and 50 ml. of cyclohexene. The reaction mixture was heated to 200° C. under autogenous pressure for a period of 6 hours. On separation of catalyst, precipitation, washing and drying, a low molecular weight unsaturated polymer of cyclohexene was obtained.

Example VI

Into a reaction flask was charged under nitrogen 8 g. of a hydrogen reduced molybdena-on-alumina (prepared according to the procedure in Example I) dispersed in 100 ml. of benzene, 1.5 g. of lithium aluminum hydride and 50 ml. of bicyclo-pentadiene. The reaction mixture was allowed to stand at room temperature for a period of 12 hours. Methanol was added to the reaction mixture to precipitate the polymer catalyst mixture. The mixture was filtered and the polymer was extracted from the catalyst with boiling xylene. A solid polymer weighing 10 g. was obtained. The polymer could be molded into stiff films, the infrared scan of which showed cis- and trans-unsaturation in the polymer.

Example VII

Into a reaction flask was charged under nitrogen 5 g. of hydrogen reduced molybdena on alumina (prepared as described in Example I) dispersed in 50 ml. of benzene, 1.5 g. of lithium aluminum hydride and 25 ml. of 1,2-dihydrobicyclopentadiene. The reaction mixture was mildly agitated at room temperature for a period of 36 hours. The polymer was obtained in the form of a gel in the solvent. The polymer and catalyst residues weighed 15 g. A sample of extracted polymer, obtained by extraction with benzene followed by precipitation, could be molded into tough, clear, rigid films. Infrared analysis of the film showed the presence of cis- and trans-unsaturation in the polymer in accordance with the following polymer structure:

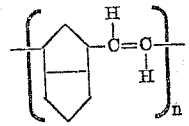

The polymers produced by the present invention are, in general, rubbery solids useful in the preparation of crosslinked elastomeric hydrocarbon polymers. As shown by the examples, the polymerization of the cyclic olefins employed in the present invention occurs principally through the breaking of the ring structure and not through the double bond which is retained in the polymer chain.

I claim:
1. A process for polymerizing cyclic olefins which comprises contacting a cyclic olefin having at least one unsubstituted ethylenic ring double bond and not more than one ethylenic double bond in each ring structure with a catalyst prepared by admixing a hydride of a metal selected from group I to III of the periodic table of elements with an oxide of a metal of group VI–B of the periodic table of elements supported on a difficultly reducible metal oxide and separating from the resulting mixture a solid polymeric hydrocarbon formed by ring opening.

2. A process for polymerizing a cyclic olefin to a solid polymer resulting from ring opening which comprises contacting a cyclic olefin having at least one unsubstituted ethylenic ring double bond and not more than one ethylenic double bond in each ring structure at a temperature of 0 to 300° C. with a catalyst prepared by admixing the hydride of a metal of group I to III of the periodic table of elements with an oxide of a metal of group VI–B of the periodic table of elements, supported on a difficultly reducible metal oxide, said group VI–B metal oxide on said support having been treated with hydrogen at a temperature of 350 to 850° C.

3. The process as set forth in claim 2 wherein the metal hydride is an alkali metal aluminum hydride.

4. The process as set forth in claim 2 wherein the metal oxide is a molybdenum oxide.

5. The process as set forth in claim 2 wherein the metal oxide is a chromium oxide.

6. The process as set forth in claim 2 wherein the polymerization is carried out in the presence of an inert hydrocarbon solvent.

7. The process as set forth in claim 2 wherein the difficult reducible metal oxide support is alumina.

8. The process of polymerizing a monocyclic monoolefin having an unsubstituted double bond which comprises contacting said olefin in the presence of an inert hydrocarbon solvent at a temperature of 0 to 300° C.

with a catalyst prepared by admixing the hydride of a metal of group III of the periodic table with an oxide of a metal of group VI–B of the periodic table supported on a difficultly reducible metal oxide, said group VI–B metal oxide on said support having been treated with hydrogen at a temperature of 350 to 850° C.

9. The process as set forth in claim 8 wherein the cyclic monoolefin is cyclopentene.

10. The process of polymerizing a bicyclic monoolefin having an unsubstituted ring double bond which comprises contacting said olefin in the presence of an inert hydrocarbon solvent at a temperature of 0 to 300° C. with a catalyst prepared by admixing the hydride of a metal of a group III metal of the periodic table with an oxide of a metal of group VI–B of the periodic table supported on a difficultly reducible metal oxide, said group VI–B metal oxide on said support having been treated with hydrogen at a temperature of 350 to 850° C.

11. The process as set forth in claim 10 wherein the bicyclic olefin is bicyclo-(2,2,1)-heptene-2.

12. The process of polymerizing a tricyclic olefin having an unsubstituted ring double bond and not more than one ethylenic double bond in each ring structure which comprises contacting said olefin in the presence of an inert hydrocarbon solvent at a temperature of 0 to 300° C. with a catalyst prepared by admixing the hydride of a metal of group III of the periodic table with an oxide of a metal of group VI–B of the periodic table supported on a difficultly reducible metal oxide, said group VI–B metal oxide on said support having been treated with hydrogen at a temperature of 350 to 850° C.

13. The process as set forth in claim 12 wherein the tricyclic olefin is bicyclopentadiene.

14. The process as set forth in claim 12 wherein the tricyclic olefin is 1,2-dihydro-bicyclopentadiene.

15. The process for polymerizing a cyclic olefin to a normally solid polymer through ring opening, which comprises contacting a cyclic olefin having at least one unsubstituted ethylenic ring double bond and not more than one ethylenic double bond in each ring structure at a temperature of 0 to 300° C. with a catalyst prepared by admixing the hydride of a metal of groups I to III with an oxide of a metal of group VI–B of the periodic table of elements, the ratio of said metal hydride to said group VI–B metal oxide varying from 0.01 to 1, said group VI–B metal oxide being supported on a difficultly reducible metal oxide in a ratio varying from 0.05 to 1, said group VI–B metal oxide on said support having been treated with hydrogen at a temperature of 350 to 850° C.

16. A normally solid polymer of cyclopentene, said polymer being capable of molding into elastomeric films and characterized by trans- and cis-unsaturation, consisting of repeating units having the formula

—CH$_2$—CH$_2$—CH$_2$—CH=CH— said polymer being obtained through ring scission polymerization of cyclopentene.

17. A normally solid polymer of 1,2-dihydro-dicyclopentadiene, capable of being molded into tough, clear rigid films, characterized by trans- and cis-unsaturation, consisting of repeating units having the formula

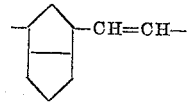—CH=CH— said polymer being obtained through ring scission polymerization of 1,2-dihydrodicyclopentadiene.

References Cited in the file of this patent
UNITED STATES PATENTS

| | | |
|---|---|---|
| 1,903,500 | Calcott et al. | Apr. 11, 1933 |
| 2,721,189 | Anderson et al. | Oct. 18, 1955 |
| 2,731,452 | Field et al. | Jan. 17, 1956 |
| 2,799,688 | Anderson et al. | July 16, 1957 |
| 2,831,037 | Schmerling | Apr. 15, 1958 |
| 2,850,488 | Baxter et al. | Sept. 2, 1958 |
| 2,868,771 | Ray et al. | Jan. 13, 1959 |
| 2,910,461 | Nowlin et al. | Oct. 27, 1959 |
| 2,932,630 | Robinson et al. | Apr. 12, 1960 |

OTHER REFERENCES

Abrahamse et al., Chemical Abstracts, vol. 51, page 15422 (1957).

Bruson et al.: Journal American Chemical Society, vol. 67, pages 723–8 (1945).

Wilder et al.: Journal American Chemical Society, vol. 78, page 5706 (1956).

Schmidt et al.: Brenstoff-Chem., vol. 23, pages 235–40, 247–52 (1942). Abstracted in Chem. Abs., vol. 37, page 4236(5).

Rudenko et al.: Daklody Akod. Nauk S.S.S.R., vol. 67, pages 855–58 (1949). Abstracted in Chem. Abs., vol. 44, page 1915f.

Truffault et al.: Compt. Rend., vol. 231, pages 1068–70. Abstracted in Chem. Abs., vol. 45, page 6163a.

Pirsch: Monatsch, vol. 85, pages 154–61 (1954). Abstracted in Chem. Abs., vol. 49, page 8137f.